Patented June 12, 1945

2,378,318

UNITED STATES PATENT OFFICE 2,378,318

2-AMINO 4-METHYLPYRIMIDINE

Elmore H. Northey, Bound Brook, N. J., assignor to American Cyanamid Company, New York, N. Y., a corporation of Maine No Drawing. Application August 6, 1941, Serial No. 405,680

8 Claims. (Cl. 260—251)

This invention relates to an improved process of preparing 2-amino 4-methylpyrimidine.

2-amino 4-methylpyrimidine is an intermediate for the preparation of 2-sulfanilamido 4-methylpyrimidine, commonly known as sulfamethyldiazine which is a product of very high bacteriostatic power. In the past 2-amino 4-methylpyrimidine has been prepared by condensing the sodium salt of oxymethylene acetone with guanidine nitrate in solution in absolute alcohol. This process involves the preparation of the sodium oxymethylene acetone, its isolation and the yields are not as good as could be desired based on the raw materials used in making the sodium oxymethylacetone. Also the numerous steps involved in the process materially increase the cost.

According to the present invention it has been found that by carrying out the reaction in solution in an aromatic hydrocarbon such as for example, toluene, benzene, xylene and the like, it is possible to react a guanidine salt with a mixture of sodium methylate acetone and ethyl formate without first forming the sodium salt of oxymethylene-acetone and recovering it. Not only is the cost of the separate steps of preparing and purifying sodium oxymethyleneacetone avoided, but the condensation proceeds more readily with good yields and particularly a very material saving in time is effected. In the process of the prior art the reaction took approximately 12 hours when carried out in absolute alcohol, whereas, by the process of the present invention satisfactory results on a comparable scale are obtainable in the order of an hour. This marked saving in time is of great importance in the commercial production of 2-amino 4-methylpyrimidine as it multiplies the output of the given equipment many times. Also it is possible with the hydrocarbon solvent to remove the sodium nitrate or other salt readily and the advantages of the shorter reaction time are obtained without any disadvantages in the operation.

While the present invention is not limited to the use of any particular hydrocarbon solvent, I have found that the toluene is desirable as it has excellent solvent properties and a boiling point suitable for azeotropic removal of the alcohol set free in the reaction. Therefore I prefer to use toluene although other hydrocarbon solvents can be employed.

The particular guanidine salt used is not normally vital. Such typical salts as guanidine nitrate, hydrochloride, and the like may be used. Because of its markedly lower price, guanidine nitrate is preferred as the results obtained are excellent.

The use of sodium methylate in the reaction is preferred because of the lower cost of the sodium salt. However, the corresponding potassium salt can be used with similar results. In the same way, methyl and ethyl formates are the preferred esters because of their low price and because the methyl or ethyl alcohol set free can be readily removed by azeotropic distillation. Other esters, however, may be used.

The invention will be described in greater detail in the following specific examples which are typical embodiments, it being understood that the invention is not to be limited thereto. The parts are by weight.

Example 1

To 400 parts dry toluene stirring in a cooling bath was added 54 parts sodium methylate. To this was added a mixture of 58 parts acetone and 78 parts ethyl formate, keeping the temperature at 20 to 30° C. The resulting thin paste was stirred 30 minutes at 20 to 30° and 96 parts guanidine hydrochloride was added.

The reaction mixture soon separated into two layers. The mixture was heated to 80° for 30 minutes and then a mixture of alcohol and toluene was distilled until the vapor distilling reached 93°. The hot toluene solution was decanted and cooled, and the crystals of 2-amino 4-methylpyrimidine was obtained. This corresponds to a yield of 39% of the theoretical, 108 parts.

Example 2

89 parts sodium methylate was added to 1100 parts dry toluene at 10° C. Then a mixture of 94.5 parts acetone and 120 parts ethyl formate was added with cooling to keep the temperature below 30° C. After one hour 200 parts of guanidine nitrate was added at 25° and after 20 minutes the reaction mixture was heated to distillation and 335 parts of distillate, mostly methyl and ethyl alcohol, were removed while the internal temperature rose to 95° C. 125 parts of water was then added to dissolve the sodium nitrate and the layer was drawn while hot. On cooling the toluene layer to 20° C., filtering and washing with toluene, 41 parts of 2-amino 4-methylpyrimidine were obtained, melting at 159–160° C. On re-extracting the salt solution with the toluene mother liquor twice a further 12 parts of base were obtained having a melting point of 157–158.5° C. which was pure enough for use in making sulfamethyldiazine.

Example 3

89 parts of sodium methylate was added to 1100 parts of kerosene at 10° C. A mixture of 94.5 parts of acetone and 97 parts methyl formate was then added with cooling to hold the temperature below 15° C. After stirring for one hour at 15° C. 200 parts of guanidine nitrate was added. The mixture was stirred for 30 minutes at 20° C., then heated and distilled to a vapor temperature of 75°. 130 parts of water was then added to dissolve the sodium nitrate and the aqueous layer was withdrawn while hot. The kerosene layer was cooled and the crystals of 2-amino 4-methylpyrimidine filtered. On re-extracting the salt solution with kerosene a further yield was obtained. The total yield of product, dried at 50° C. was 40 parts having a slight residual odor of kerosene and melting at 154° to 157° C.

I claim:

1. A method of preparing 2-amino 4-methylpyrimidine which comprises mixing a guanidine salt and a mixture of an alkali methylate, acetone and an ester of formic acid in a hydrocarbon solvent and recovering the 2-amino 4-methylpyrimidine thus formed.

2. A method of preparing 2-amino 4-methylpyrimidine which comprises mixing a guanidine salt and a mixture of an alkali methylate, acetone and an ester of formic acid in an aromatic hydrocarbon solvent and recovering the 2-amino 4-methylpyrimidine thus formed.

3. A method of preparing 2-amino 4-methylpyrimidine which comprises mixing a guanidine salt and a mixture of an alkali methylate, acetone and an ester of formic acid in toluene and recovering the 2-amino 4-methylpyrimidine thus formed.

4. A method of preparing 2-amino 4-methylpyrimidine which comprises mixing a guanidine salt and a mixture of sodium methylate, acetone and ethyl formate in a hydrocarbon solvent and recovering the 2-amino 4-methylpyrimidine thus formed.

5. A method of preparing 2-amino 4-methylpyrimidine which comprises mixing a guanidine salt and a mixture of sodium methylate, acetone and ethyl formate in toluene and recovering the 2-amino 4-methylpyrimidine thus formed.

6. A method according to claim 3 in which the alcohol formed in the reaction is removed by azeotropic distillation with the toluene.

7. A method according to claim 5 in which the alcohol formed in the reaction is removed by azeotropic distillation with the toluene.

8. A method of preparing 2-amino 4-methylpyrimidine which comprises mixing a guanidine salt and a mixture of sodium methylate, acetone and methyl formate in a hydrocarbon solvent and recovering the 2-amino 4-methylpyrimidine thus formed.

ELMORE H. NORTHEY.